Oct. 31, 1939.  V. H. TAGGART  2,177,915
TYPEWRITING MACHINE
Filed Aug. 25, 1936
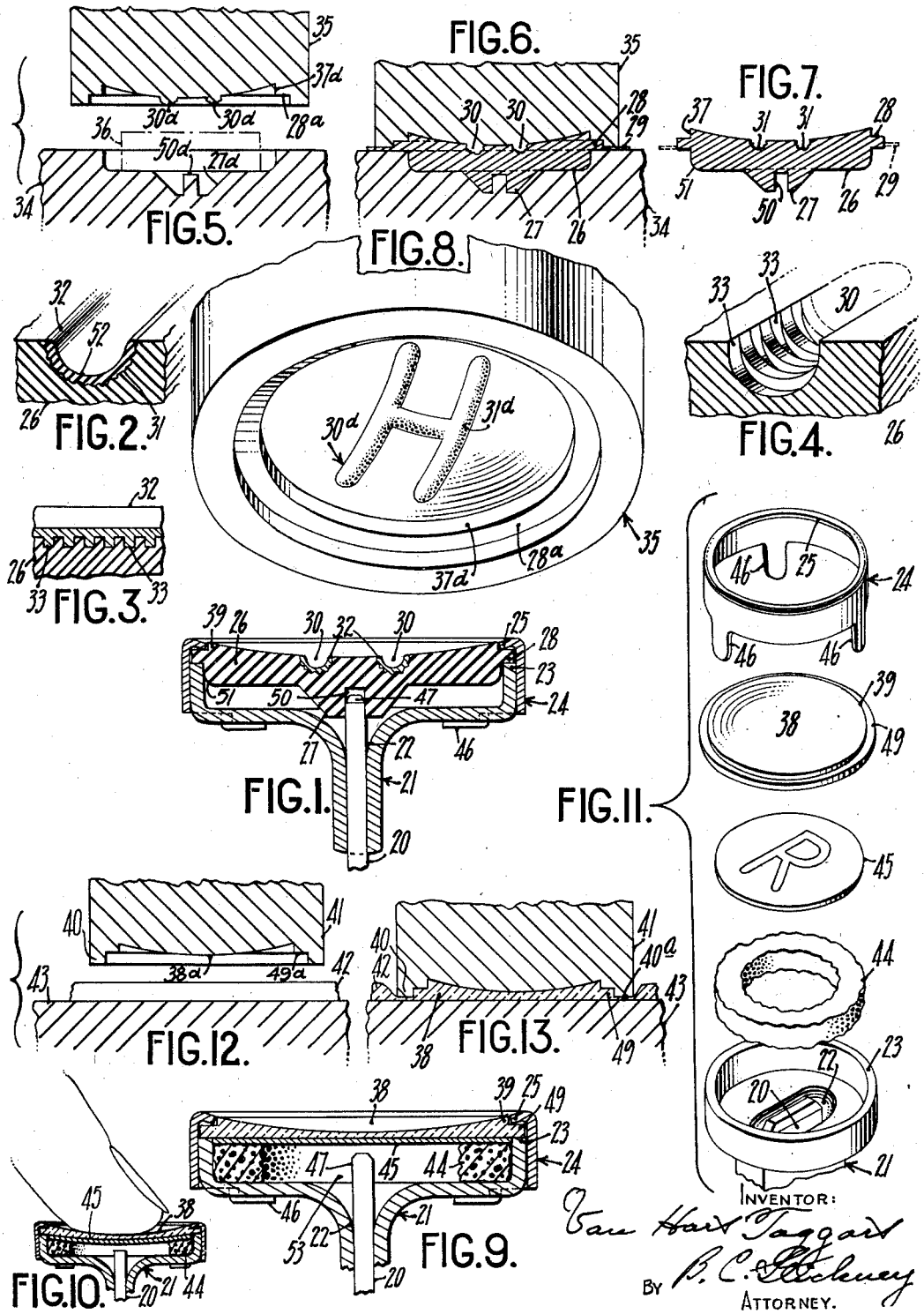

Patented Oct. 31, 1939

2,177,915

UNITED STATES PATENT OFFICE 2,177,915

TYPEWRITING MACHINE

Van Hart Taggart, West Hartford, Conn., assignor to Underwood Elliott Fisher Company, New York, N. Y., a corporation of Delaware Application August 25, 1936, Serial No. 97,731

8 Claims. (Cl. 197—103)

This invention relates to the keys of typewriting machines and the like. For many years glass finger-keys have been used, because the hardness of the glass prevents them from being scratched or marred by the fingers of the operator. This preservation of their newness or original finish has made glass-topped finger-keys specially valuable for use on typewriting machines put out on trial, because, when the trial machines are returned, the glass keys retain their original polished condition. A constant objection to glass keys, however, is that they are secured in place by annular metal key-caps which have inturned overhanging flanges which function to hold the glass disks down in the key-lever cups. The fact that these overhanging flanges project considerably above the contained glass key-disks causes the flanges to punish the fingers of the typists. The very hardness of the glass itself is also objected to by many typists so that frequently they have installed rubber-cushioned covers on each of the finger-keys to provide yielding or resilient tops for the keys to obviate this objection.

Molded materials such as Celluloid provide a top surface, for receiving the impact of the typist's fingers, of a smaller degree of hardness than glass. Finger-keys molded in one piece and mounted upon the key-stems have been used to equip many typewriting machines. An objection to the molded key is that, being made of Celluloid, shellac, or the like, the molded key is apt to become scratched or defaced, and therefore it is poor business to put out typewriting machines on trial equipped with these molded keys that have to be replaced when the trial machines are returned. The molded keys not alone eliminate the hard glass key-tops, but also have an advantage over glass key-tops in being concave, the concave form being conducive to better-distributed contact between the key-tops and the finger-tips, whereby general fatigue of the finger-tips is substantially reduced. However, on the other hand, molded keys have a further disadvantage from the nature of their chemical composition which is such that they are easily ignitible. Their low ignition point both creates a fire hazard and a very great prejudice in the minds of the users of typewriting machines.

It is a feature of the present invention to provide finger-keys for typewriting machines which either obviate, eliminate or abate the causes of the foregoing objections.

Other features of the invention involve the provision of improvements hereinafter recited.

One improvement is a transparent key-top made of molded material, inherently softer than glass, having an upper peripheral depression which receives an inturned flange of a metal keycap so that the top of the key and of the flange form a coextensive surface.

Another improvement is a transparent key-top made of molded material that overlies the upper edge of the metal key-cup and is supported thereby, and that has a thickness generally and gradually decreasing toward the center of the key-top in order to produce a centrally increasing yieldability or resiliency proportioned to the force of impact of various parts of the operator's finger upon the key.

Another improvement is a transparent disk which exposes a type-character mounted on a plate held in yieldable contact with the lower surface of the transparent disk by an elastic rubber cushion supported by the bottom of the metal key-cup.

Another improvement is a transparent disk of molded material, such as cellulose acetate, which is very clear and much less inflammable than the nitrate, overlying a dark background on which the character is imprinted in white, whereby the glare of light reflected from the keyboard is substantially abated with the effect of less fatigue and therefore greater efficiency of the operator.

The concave upper surfaces of the keys and the surrounding key-caps with their inturned metal flanges protect the molded material in the concave key-tops from contact with sources of ignition, thereby substantially eliminating the fire hazard.

Type-keys have been molded in circular form with concave tops of dark cellulose acetate to provide a type-key of low inflammability having recesses formed centrally of the concave top outlining a type-character corresponding to the type to be actuated, and the recesses filled with white paint, such as lead acetate. A difficulty experienced with such type-keys so formed has been the chipping or breaking out of the white-paint filler from the recesses. This trouble becomes more serious when a typewriter is in foreign or parts remote or far-away from establishments for the service and repair of typewriters.

It is also a feature of the present invention to provide a type-key formed of moldable material such as cellulose acetate having type-character recesses therein filled with a paint or other filler of contrasting color in which the resistance to chipping or breaking out of the type-character filler is greatly increased, and more particularly to provide a type-key formed of dark moldable material as above set forth in which white paint is used to fill the type-character recesses.

Another feature of the invention is an improvement in the art or process of manufacture of type-keys formed of moldable material and having type-character recesses therein filled with paint.

Other features and advantages will hereinafter appear.

In the accompanying drawing,

Figure 1 is a vertical, transverse section of a key having a finger-contacting concave top surface molded of dark cellulose acetate with a letter formed therein of white paint.

Figure 2 is an enlarged perspective view sectioned to show the form of a concave letter recess roughened better to effect the adherence of the coating of pair thereto, in which the roughening has been produced by applying acid to the corresponding part of the die.

Figure 3 is a section taken lengthwise of the groove shown in Figure 2 but showing a modification in which the die has been roughened by a tool which has produced square-shaped transverse secondary grooves for enhancing the adherence of the paint.

Figure 4 is a perspective similar to Figure 2 of the modification shown in Figure 3 but before the paint has been applied to the groove.

Figure 5 is a vertical section of the mold broken apart, the material being shown in dot-and-dash outline.

Figure 6 is a vertical section showing the die closed and the top disk formed.

Figure 7 is a vertical cross-section of the button as it is removed from the mold and before it has been tumbled.

Figure 8 is a perspective showing the face of the top part of the die.

Figure 9 is a vertical section through a modified form of key-cap, which has a top disk of cellulose acetate.

Figure 10 is a view similar to Figure 9 but under finger pressure.

Figure 11 is a perspective view of the modification shown in Figure 9 with the parts broken away, and in disassembled position.

Figure 12 is a vertical section showing the two parts of the die broken apart.

Figure 13 is a view similar to Figure 12, showing the parts molding the transparent top disk.

A preferred method of manufacture of type-keys, such as shown in Figure 1, of moldable material of one color having recesses formed therein and filled with a paint-filler of another color, comprises the following steps:

(1) A mold 34, 35 is provided of the desired size and form; (2) a pellet 36 of moldable material of the required size is introduced into the lower part 34 of the mold; (3) heat is applied to the lower part 34 of the mold to make the pellet 36 plastic; (4) the type-character projection 30$^d$ from the convex upper part of the mold 35 having been roughened with acid or otherwise to get a rough, irregular surface 31$^d$, pressure applied by the upper mold 35 forms the type-character recess 30 and simultaneously roughens the bottom surface 31 of the recess; (5) excess material in irregular protuberances 29 is removed from the molded form by tumbling, in a tumbling machine; (6) paint 32 of a color contrasted with that of the moldable material is brushed into the type-character recess 30 and the excess paint 32 wiped off; (7) the paint 32 is dried; and (8) the top of the cap is polished to remove paint stains and to polish the surface.

The moldable material is preferably of cellulose acetate, which is less inflammable than cellulose nitrate (Celluloid). The upper surface of the key is preferably concave. The moldable material is preferably dark in color. The paint is lead acetate, white in color and carries more pigment than usual. This lead acetate paint has been found better to adhere to moldable material formed of the highly inflammable cellulose nitrate. The roughened bottom of the character recess provides a larger area for the adhesion of paint than a plane-surface bottom, and the inclination of the various surfaces to the vertical increases the adhesion of the bottom of the paint character, so that the acetate paint is secured in recesses in the substantially non-inflammable acetate cellulose with enough adhesion to eliminate dripping of the paint from out of the type-character recesses 52.

Referring to Figures 1 and 9, there are shown two modifications of a key-cap formed with a concave top disk of moldable material. These two modifications have certain characteristics in common. They are both mounted on the forward upturned end of the key-lever 20 and have the metal key-cup 21 which has a slot 22 at the lower end to fit over and be supported on the end of the key-lever 20. The key-cup 21 terminates in an annular upwardly projecting rim 23 and is surrounded by a key-cap 24 which snugly fits over the key-cup 21 and has at the top an annular inturned flange 25. Both disks 26 and 38 of molded material have concave top surfaces with peripheral annular flanges 28 and 49 which are coextensive in diameter with the key-cup 21, so that these flanges rest upon and lock the corresponding disk on top of the key-cup 21.

Referring to Figure 1, the disk or button 26 is formed of substantially thick dark colored moldable material and has a central downwardly-projecting shank 27 provided with a central slot 50 therein. A peripheral flange 28 is formed by cutting away the outer top edge of the disk 26, the depth of the cut being substantially equal to the thickness of the inturned flange 25, so that when the disk 26 and the flange 25 are assembled with the outwardly-projecting flange 28 overlying the rim 23 but within the cap 24, the top concave surface of the disk 26 is coextensive with the top of the inturned flange 25, so that together they form a generally concave top. In this modification, the letters or characters used on the type are reproduced in the top surface of the concave disk 26 by forming grooves or concave recesses 30, each character corresponding to the character of the type actuated by the key-lever 20. It is desirable to reduce the inflammability of key-caps formed of moldable material, so that cellulose acetate is used rather than cellulose nitrate (Celluloid) for the material to be molded. The recesses are filled with a white paint 32 having the composition of lead acetate. In order to procure better adherence of the lead acetate paint to the bottoms of the recesses 30, the bottoms of the surfaces of the grooves 30 are roughened in two different ways. In one form, the convex type-character form 30$^d$ in the mold, as shown in Figure 8, has acid roughened serrations 31$^d$. The effect of the acid roughening 31 on the bottom of the grooves is to increase the total area of the surface of the bottom of the groove which provides a greater total area of adhering surface between the molded material and the white paint 32. The outer edge of the top of the disk 26 terminates in a vertical annular wall 37, which is formed by a vertical annular wall 37d in the upper face of the die or mold 35. The die includes an annular recess 28a to form the flange 28 of the key disk 26. The lower part of the die or mold 34 is provided with means for introducing heat into the die so that when a pellet or small piece of material 36 is introduced into the recess in the top of the lower part 34, the pellet or small piece 36 is immediately heated for molding. In Figure 2, it is shown that the coating of paint 32 may leave a concave recess 52 which is smaller in diameter but of the same form as the concave recess 30. As the dies unite to mold the pellet 36, the excess material, if any, is squeezed out between the edges of the die to form a peripheral fin or protuberance 29, as shown in Figures 6 and 7. This fin 29 is removed by the usual process of tumbling the completed molded disks 26. As an alternative form of roughening the bottoms of the grooves 30, a tool is used to provide transverse parallel slots 33, which are rectangular in cross-section as shown in Figure 3. These slots are formed by providing a similar formation on the convex protuberance of the upper part 35 of the die. They also serve to increase the area of any groove 30. The application of paint 32 to grooves 30 provided with these transverse rectangular impressions 33 is shown in Figure 3. The shank 27 shown in Figure 7 with its transverse rotation-locking groove 50 is formed by a concave annular recess 27d, provided with a diametrical protuberance 50d in the lower part 34 of the die. After the disk 26 is assembled on the rim 23 of the cup 21 with its outer peripheral flange 28 overlying the top rim 23 and the cap 24 is pushed down to lock the disk 26 in place, three tabs 46, as shown in Figure 11, which are coextensive with the key-cap 24, are turned under the cup 21, and lock the disk securely in place, rotation thereof being prevented by the beveled top 47 of the key-lever 20 projecting into the slot 50 formed in the downwardly-projecting shank 27. The beveled top 47 of the key-lever 20 provides easy assembly of the key-cup 21 and the disk 26.

Referring now to Figures 9, 10 and 11, the top disk 38 is of transparent cellulose acetate having a concave top surface, a flat or plane bottom, and a peripheral rim 39 which, together with the annular peripheral flange 49, forms a recess for the positioning of the inturned flange 25 which forms the top of the key-cap 24. This construction provides a concave top for the key since the inturned flange 25 is coextensive with the concave top of the disk 38. This disk is considerably thinner than the disk 26, shown in Figure 1, and is spaced at the center a substantial distance above the end 47 of the key-lever 20. The outer edge or periphery rests on the top rim 23 of the key-cup 21. Within the key-cup 21 and immediately underlying the flat surface of the transparent concave disk 38 is a paper-disk 45 which may have a dark colored top with a centrally positioned character imprinted in white thereon. The character might also be imprinted on the bottom of the transparent disk 38. This disk is of relatively stiff paper and rests upon an annular support 44 of spongy rubber which affords considerable yieldability to the disk 38 when impressed by the finger of an operator, as shown in Figure 10, the yieldability increasing towards the center at which point the disk 38 is thinnest and overlies a confined air-space 53 within the annular rubber element 44.

It will be obvious from a consideration of the foregoing that the assembled key, as illustrated in Figures 9 and 10, affords appreciable yieldability to the finger touch of the operator, in that the character-disk is formed of a relatively soft moldable material having a concave upper surface and a plane bottom surface, the transparent disk 38 being backed by the character disk 45, and the cushioning ring 44 in support of marginal portions only, of the character-disk. The plano-concave shape of the transparent disk assures maximum yieldability at the center thereof so that the transparent disk in association with the character-disk is readily yieldable to a maximum extent at the center thereof under pressure of the operator's finger to afford a soft, cushion-like touch, the ring 44 cushioning the character-disk in a manner to afford a very soft resilience at the center of the disk and also to resist flexure at marginal portions of the disk, the resistance to flexure increasing substantially adjacent the periphery of the disk. Such an organization has, in addition to the above characteristics of operation, other advantages in manufacture, in that the plano-concave transparent disk accommodates the more economically manufactured character-disk, the latter being readily printed on flat paper stock in a complete set including the entire group of key-characters, the respective disks being cut from the sheet after printing and being thus ready for assembling in the key without further processing.

As indicated in Figure 11, the assembly is made of the parts in the order shown. Figures 12 and 13 show the two parts 41 and 43 of a die with a strip 42 of transparent cellulose acetate. The convex portion 38d in the upper die is of the form to mold the top concave surface of the disk 40 38, the annular flange 49d of the die forming the annular flange 49 of the disk. The die 41 has an annular rim 40 to form the outline of the finished disk 38. See Figures 12 and 13. This rim 40 may produce a thin fin 40a and the formed disk 45 may easily be broken out of the stock material 42. The top 47 of the key-lever 20, as shown in Figure 1, is formed with beveled surfaces for the facile insertion of the key-level 20 in the slots 22 and 50. In either of the modifications, the surface is considerably less hard than is that of the glass disks used, and in the modification shown in Figure 9, considerable yieldability is provided for operators desiring this form of key.

Variations may be resorted to within the scope of the invention, and portions of the improvements may be used without others.

Having thus described my invention, I claim:

1. A finger-key for typewriting machines and the like, including in combination, a disk of transparent molded material for the top that is yieldable at the center, that has a peripheral depression, and that has a concave top and a plane-surfaced bottom, a metal key-cup, the upper rim of which supports the said disk at the outer edge whereby the center of said disk may yield downwardly under finger-pressure, a relatively stiff paper disk underlying said transparent disk, a metal key-cap having an inturned flange that overlies said peripheral depression, and an annular resilient element within said key-cup and supporting said paper disk at the periphery and providing an intermediate pneumatic cushion.

2. A finger-key for typewriting machines and the like including, in combination, a disk of transparent molded material for the top, providing visibility for a type character, that has generally and gradually increasing yieldability towards the center, that has a peripheral depression and that has a concave upper surface, and a metal key-cap having an inturned flange that overlies said peripheral depression, the top of said flange and the upper wall of said disk being curvaturely coextensive.

3. A finger-key for typewriting machines and the like, including in combination, a disk of transparent molded material for the top that is yieldable at the center, that has a peripheral depression, and that has a concave top, a metal key-cup, the upper rim of which supports the said disk at the outer edge whereby the center of said disk may yield downwardly under finger pressure, a relatively stiff paper disk underlying said transparent disk, a metal key-cap having an inturned flange that overlies said peripheral depression, and an annular soft-rubber element within said key-cup and supporting said paper disk at the periphery and providing an intermediate pneumatic cushion.

4. A finger-key for typewriting machines and the like, including in combination, a base mountable on a key-lever, a top disk of substantially flexible material supported at its periphery only on said base, a relatively stiff flat disk backing said top disk, and a resilient element yieldably supporting the margin only of said backing disk to cushion flexure of same; affording maximum yieldability to finger touch at the center of the key and a lesser degree of yield near the periphery thereof.

5. A finger-key for typewriting machines and the like, including in combination, a base mountable on a key-lever, a top disk of flexible transparent material supported at its periphery only on said base, a character-disk of relatively stiff material backing said transparent disk, and a resilient ring on said base cushioning said character-disk at the margin thereof only; affording maximum yieldability to finger touch at the center of the key and a lesser degree of yield near the periphery thereof.

6. A finger-key for typewriting machines and the like, including in combination, a base mountable on a key-lever, a transparent disk of substantially flexible material supported at its periphery only on said base and having a concave top surface and a plane bottom surface, a relatively stiff flat disk underlying said transparent disk, and a resilient ring on said base yieldably supporting the margin only of the underlying disk; affording maximum yieldability to finger touch at the center of the key and a lesser degree of yield near the periphery thereof.

7. A finger-key for typewriting machines and the like, including in combination, a cup adapted for mounting on a key-lever and having a rim, a transparent disk of substantially flexible material resting on said cup-rim and having a concave top surface and a plane bottom surface, a flat character-disk backing said transparent disk and within said cup-rim, and a resilient ring in said cup, cushioning the margin only of said character-disk; affording maximum yieldability at the center of the key and a lesser degree of yield near the periphery thereof.

8. A finger-key for typewriting machines and the like, including in combination, a cup adapted for mounting on a key-lever and having a rim, a transparent disk of substantially flexible material resting on said cup-rim and having a concave top surface and a plane bottom surface affording a substantial thickness adjacent the periphery of the disk and maximum yieldability at the center thereof and having a peripheral recess, a flat character disk backing said transparent disk and within said cup-rim, a resilient ring in said cup, cushioning the margin of said character disk, and a key-cap having an inturned flange disposed in the peripheral recess and flush with the concave surface of said transparent disk.

VAN HART TAGGART.